Figure 1:
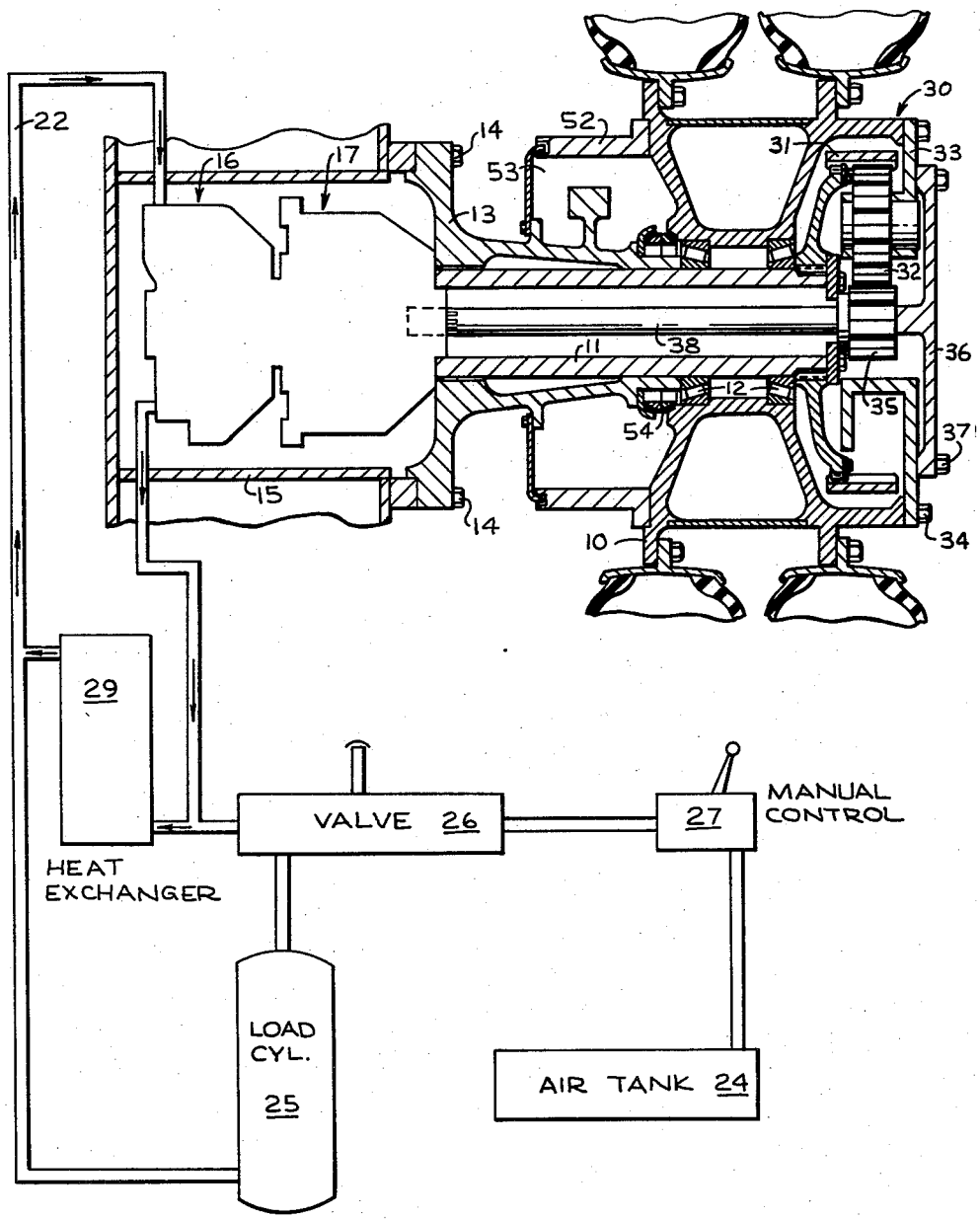

May 25, 1965     J. J. CAMPBELL ETAL     3,185,261
WHEEL DRIVEN HYDRODYNAMIC RETARDER SYSTEM
Filed Oct. 25, 1963     2 Sheets-Sheet 1

INVENTORS
JOHN J. CAMPBELL
VERGIL P. HENDRICKSON
BY ALFRED W. SIEVING

ATTORNEYS

May 25, 1965   J. J. CAMPBELL ETAL   3,185,261
WHEEL DRIVEN HYDRODYNAMIC RETARDER SYSTEM
Filed Oct. 25, 1963                                              2 Sheets-Sheet 2

INVENTORS
JOHN J. CAMPBELL
VERGIL P. HENDRICKSON
BY ALFRED W. SIEVING
ATTORNEYS

3,185,261
WHEEL DRIVEN HYDRODYNAMIC RETARDER SYSTEM

John J. Campbell, Vergil P. Hendrickson, and Alfred W. Sieving, Decatur, Ill., assignors to Caterpillar Tractor Co., Peoria, Ill., a corporation of California
Filed Oct. 25, 1963, Ser. No. 319,035
1 Claim. (Cl. 188—90)

This invention relates to hydrodynamic retarding of vehicles and particularly to a retarding system driven by a vehicle wheel and operable at extremely high speed.

Serious problems have occurred in braking the speed of the larger vehicles which are being used in the earthmoving industry. High speed, long haul and long downhill grades place excessive demands on the service brakes of these vehicles. Hydrodynamic retarders are recognized as a means to relieve the brakes of excessive duty with the attendant destructive effects resulting from heat friction and vibration. Retarders have long been used in association with vehicle transmissions and power trains. It is most desirable that retarders should be associated with and driven by the trailing wheels of a large vehicle. However since the wheels are usually very large, their rate of rotation compared to speed of the vehicle over the ground is very slow. Further, since the absorption capability of hydrodynamic retarders depends upon speed and diameter attempts to drive retarders by vehicle wheels through a low ratio speed increaser have resulted in a bulky and expensive retarder design which has proven unsatisfactory.

It is an object of the present invention to provide a hydrodynamic retarder and drive therefor associated with and driven entirely by a vehicle wheel through power transmission mechanism which is simple and compact and capable of driving the retarder at a very high speed.

A further object is to provide a retarder and a power transmission therefor including two planetary gear trains in series entirely carried by the wheel and axle assembly of a vehicle.

Further and more specific objects and advantages of the invention and the manner in which it is carried into practice are made apparent in the following specification wherein reference is made to the accompanying drawings.

Figure 2:
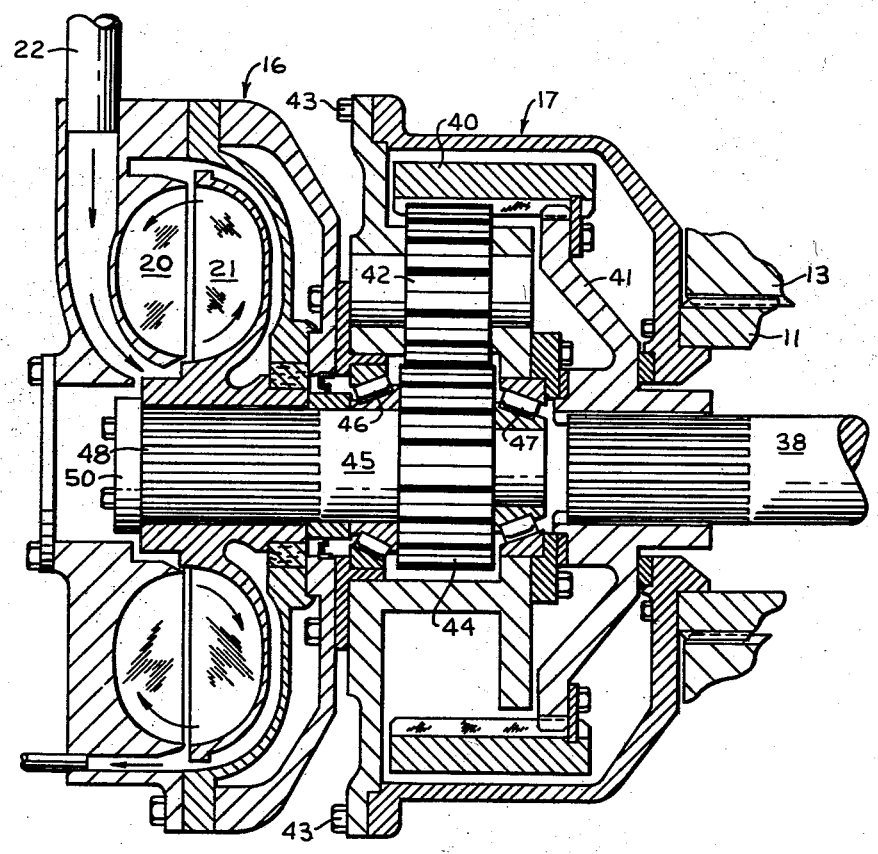

In the drawings:

FIG. 1 is a sectional view through the wheel and axle of a vehicle showing a portion of a power transmission and schematically illustrating the other portion of such transmission and a hydrodynamic retarder associated therewith, all constructed in accordance with the present invention; and FIG. 2 is an enlarged sectional view through the hydrodynamic retarder and one phase of the power transmission associated therewith.

Referring first to FIG. 1, the wheel of a large earthmoving wagon or the like is illustrated at 10 as supported for rotation about an axle 11 as by bearings shown at 12. The axle has a supporting housing 13 secured as by a circle of cap screws 14 to a hollow frame member 15 of the vehicle. A hydrodynamic retarder, generally indicated at 16, is shown in greater detail in FIG. 2. One phase of a transmission through which the retarder is driven is generally indicated at 17 as supported by the axle 11 and as supporting the retarder unit 16.

The retarder 16 is of conventional form and includes an annular stator 20 and a rotor 21 of similar shape, both contained within a fluid tight housing. Fluid under pressure is introduced to the housing through a line 22 and resistance to turning of the rotor is proportionate to the pressure of fluid in the housing. The rotor is charged with hydraulic fluid under pressure for the system schematically shown in FIG. 1 which includes a source of compressed air such as a tank 24 and a load cylinder 25. The load cylinder contains a supply of hydraulic fluid which is forced into the retarder by air pressure through the line 22 under control of a valve 26 and a manual control shown at 27. The retarder when driven also acts as a pump and circulates fluid in a closed circuit through a heat exchanger 29 which dissipates heat absorbed by the fluid in the retarder all in a well known manner.

The rotor 21 of the retarder is driven by the wheel 10 through two planetary gear trains, one generally indicated at 30 in FIG. 1 and the other previously mentioned and shown at 17. The gear train 30 is contained within a compartment provided at the outer side of the wheel and comprises a ring gear 31 fixed against rotation by a splined connection with the axle 11 as shown. Planets 32 are carried by a planet carrier 33 secured to the wheel as by a circle of cap screws shown at 34. Thus, as the wheel rotates, the planets rotate in mesh with the stationary ring gear and impart rotation to a sun gear 35 which floats between the three planets and has a thrust surface engaging a central projection on a plate 36 secured to the planet carrier as by a circle of cap screws 37. The sun gear 35 is fixed to and imparts rotation to a shaft 38 which extends through the hollow axle 11 and, as shown in FIG. 2, carries and imparts rotation to a ring gear 40 of a second planetary train through a supporting member 41. Planets 42 are supported on a stationary planet carrier secured to the gear train housing by a circle of cap screws 43. These planets are rotated by the rotating ring gear 40 and in turn impart rotation to a sun gear 44 fixed to a shaft 45 which is journaled in bearings as illustrated at 46 and 47. The end of the shaft 45 has a splined connection as shown at 48 with the rotor 21 in the retarder and the rotor is held in place thereon as by a thrust plate 50.

With the arrangement disclosed, very high speeds may be imparted to the rotor of the retarder and in the construction herein illustrated, a 20-1 step-up ratio between the wheel and the rotor is achieved. As an example in one large earthmoving wagon in which the construction shown has been used, a vehicle speed of twenty-five miles per hour results in retarder operation at approximately 2,000 r.p.m.

Not only has efficient retarding been achieved through the present invention but the components of the retarder and transmission units are simple and readily accessible for repair and replacement. For example by removal of cap screws 14, the entire wheel unit, transmission and retarder can be removed from the wagon, it being understood that the fluid circuit and controls of FIG. 1 are mounted on the wagon and need only be disconnected from the retarder. After the wheel unit is removed, the retarder can easily be disassembled or removed and the gear train 17 is accessible by removal of the cap screws 43 which supports the planet carrier. The gear train 30 is also readily accessible before or after removal of the wheel unit by removing the plate 36 or the carrier 33 or both.

Though not a part of the present invention, the construction lends itself to the use of a friction brake on the same wheel which drives the retarder. To accomplish this, an annular drum 52 is fixed to the inner side of the wheel providing a chamber 53 within which shoe-type brakes or the like (not shown) may be arranged in a conventional manner. The brake chamber 53 is preferably dry and sealed from lubricant in the area of the wheel bearing by a seal assembly such as indicated at 54.

Retarders such as herein disclosed may be used on one or more wheels of the same vehicle.

We claim:

A retarder system for a vehicle having a wheel rotatable about a hollow axle secured to the vehicle comprising a planetary type transmission driven by and disposed within the wheel at its outer side, a shaft extending inwardly through the axle and driven at greater than wheel speed by said transmission, a second planetary transmission driven by said shaft and disposed inwardly of the axle, a hydrodynamic retarder having a rotor driven by said shaft at greater than shaft speed, said wheel, axle, transmission, and retarder being assembled as a unit, and means removably securing said unit to the vehicle.

References Cited by the Examiner

UNITED STATES PATENTS

| | | | |
|---|---|---|---|
| 2,517,531 | 8/50 | Anderson | 188—90 |
| 2,543,929 | 3/51 | Olman | 188—90 |
| 2,981,380 | 4/61 | Lessly | 188—90 |
| 3,108,660 | 10/63 | Smith | 188—90 |
| 3,122,220 | 2/64 | Hoffstrom | 188—96 X |
| 3,142,361 | 7/64 | Kleman | 188—90 |

EUGENE G. BOTZ, *Primary Examiner.*

ARTHUR L. LA POINT, *Examiner.*